US011880284B2

(12) United States Patent
Furuhashi

(10) Patent No.: US 11,880,284 B2
(45) Date of Patent: Jan. 23, 2024

(54) STORAGE RESTORE SYSTEM, STORAGE RESTORE METHOD, AND STORAGE MEDIUM

(71) Applicant: Hitachi, Ltd., Tokyo (JP)

(72) Inventor: Ryo Furuhashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/697,989

(22) Filed: Mar. 18, 2022

(65) Prior Publication Data

US 2022/0382653 A1 Dec. 1, 2022

(30) Foreign Application Priority Data

May 28, 2021 (JP) ................................. 2021-090208

(51) Int. Cl.
*G06F 11/14* (2006.01)
*G06F 16/13* (2019.01)

(52) U.S. Cl.
CPC .......... *G06F 11/1469* (2013.01); *G06F 16/13* (2019.01)

(58) Field of Classification Search
CPC .. G06F 11/14; G06F 11/1469; G06F 11/1448; G06F 16/13
See application file for complete search history.

(56) References Cited

U.S. PATENT DOCUMENTS

| 10,838,821 | B2 * | 11/2020 | Bhagi | G06F 16/119 |
|---|---|---|---|---|
| 11,467,914 | B2 * | 10/2022 | Bhagi | G06F 11/1448 |
| 2018/0225177 | A1 * | 8/2018 | Bhagi | G06F 11/1451 |
| 2020/0401487 | A1 * | 12/2020 | Ghodake | G06F 11/1469 |
| 2021/0026739 | A1 * | 1/2021 | Bhagi | G06F 11/1464 |
| 2022/0019351 | A1 * | 1/2022 | Rao | G06F 3/0631 |
| 2022/0229732 | A1 * | 7/2022 | Chitloor | G06F 11/1456 |
| 2022/0283902 | A1 * | 9/2022 | Malamut | G06F 11/1464 |
| 2022/0283904 | A1 * | 9/2022 | Chopra | G06F 11/1451 |
| 2022/0382652 | A1 * | 12/2022 | Yadav | G06F 11/1461 |
| 2022/0382653 | A1 * | 12/2022 | Furuhashi | G06F 11/1469 |
| 2022/0413967 | A1 * | 12/2022 | Bhagi | G06F 16/164 |
| 2023/0099014 | A1 * | 3/2023 | Sagiraju | G06F 11/1464 |
|  |  |  |  | 714/6.12 |

FOREIGN PATENT DOCUMENTS

| JP | 2010-532526 A | 10/2010 |
|---|---|---|
| JP | 2012-524947 A | 10/2012 |

\* cited by examiner

*Primary Examiner* — Kamini B Patel
(74) *Attorney, Agent, or Firm* — Mattingly & Malur, PC

(57) ABSTRACT

A storage restore system includes a processor, a memory, and a restore part configured to generate, in a recovery-destination storage area to which to recover a file or a directory stored in a designated storage area and indicated by object data including the file or the directory and parent directory information which is information on a directory to which the file or the directory belongs, a directory indicated by the parent directory information in the object data, and configured to generate the file or the directory indicated by the object data under the directory thus generated.

9 Claims, 18 Drawing Sheets

METADATA OF OBJECT DATA

| meta-data | value |
|---|---|
| size | \<FILE SIZE\> |
| mtime | \<TIME OF LAST UPDATE\> |
| mode | \<FILE PERMISSION INFORMATION AND FILE TYPE\> |
| owner | \<UID\> |
| group | \<GID\> |
| path-info | \<OBJECT NAME OF PARENT DIRECTORY\>/\<NAME OF FILE (DIRECTORY) ITSELF\> |

FIG. 6

DIVISION MANAGEMENT INFORMATION 410

| INFORMATION | VALUE |
|---|---|
| PARALLELISM LEVEL | ANY NATURAL NUMBER |
| ID (INDEX) OF EACH RESTORE PROGRAM | INTEGER OF 0 OR GREATER SERIALIZED FOR RESTORE PROGRAMS |

401 — PARALLELISM LEVEL
402 — ID (INDEX) OF EACH RESTORE PROGRAM

FIG. 9

STORAGE RESTORE SYSTEM, STORAGE RESTORE METHOD, AND STORAGE MEDIUM

CROSS-REFERENCE TO RELATED APPLICATION

This application claims priority pursuant to Japanese patent application No. 2021-090208, filed on May 28, 2021, the entire disclosure of which is incorporated herein by reference.

BACKGROUND

Technical Field

The present disclosure relates to a storage restore system, a storage restore method, and a storage medium.

Related Art

To prepare for contingencies, directories and files stored in a file storage shared between networks, such as a network-attached storage (NAS), are backed up in a backup system such as a cloud storage (Japanese Unexamined Patent Application Publication (Translation of PCT Application) Nos. 2010-532526 and 2012-524947).

Many backup systems store backup-target directories and files as pieces of object data along with their identification information, and later, recover the directories and the files back to a file storage based on the object data.

Such object data in a backup system cannot be stored having the structure of the file system used in the file storage, e.g., a directory hierarchical structure. Thus, conventionally, when a directory is backed up, object data on the directory is stored along with the file name of a child element of the directory (i.e., a file inside the directory) and identification information on an object corresponding to the file, and these pieces of information are used for recovery. For faster recovery, a plurality of nodes are often used to execute parallel processing.

However, in such a method, the recovery has to be done sequentially from the highest layer to the lower layer of directories, and therefore the order of recovery processing becomes limited more and more toward the lower layer. Thus, even in an environment where, for example, parallel processing by a plurality of nodes is possible, the merits of the parallel processing cannot be fully utilized.

SUMMARY

The present disclosure has been made in view of the above circumstances, and aims to provide a storage restore system, a storage restore method, and a storage medium storing a storage restore program that enables fast recovery of directories and files.

An aspect of this disclosure is a storage restore system comprising: a processor; a memory; and a restore part configured to generate, in a recovery-destination storage area to which to recover a file or a directory stored in a designated storage area and indicated by object data including the file or the directory and parent directory information which is information on a directory to which the file or the directory belongs, a directory indicated by the parent directory information in the object data, and configured to generate the file or the directory indicated by the object data under the directory thus generated.

Another aspect of this disclosure is a storage restore method implemented by an information processing apparatus configured to execute restore processing including generating, in a recovery-destination storage area to which to recover a file or a directory stored in a designated storage area and indicated by object data including the file or the directory and parent directory information that is information on a directory to which the file or the directory belongs, a directory indicated by the parent directory information in the object data, and generating the file or the directory indicated by the object data under the directory thus generated.

Another aspect of this disclosure is a storage medium storing a storage restore program to be executed by an information processing apparatus configured to execute restore processing including generating, in a recovery-destination storage area to which to recover a file or a directory stored in a designated storage area and indicated by object data including the file or the directory and parent directory information which is information on a directory to which the file or the directory belongs, a directory indicated by the parent directory information in the object data, and generating the file or the directory indicated by the object data under the directory thus generated.

The present disclosure enables fast recovery of directories and files.

Problems to overcome, configurations, and advantageous effects other than the above will be demonstrated by the embodiment below.

BRIEF DESCRIPTION OF THE DRAWINGS

FIG. 6 is a diagram showing an example data structure of metadata of object data.

FIG. 9 is a diagram showing an example of division management information.

DETAILED DESCRIPTION OF EMBODIMENTS

Embodiment 1

Figure 1:
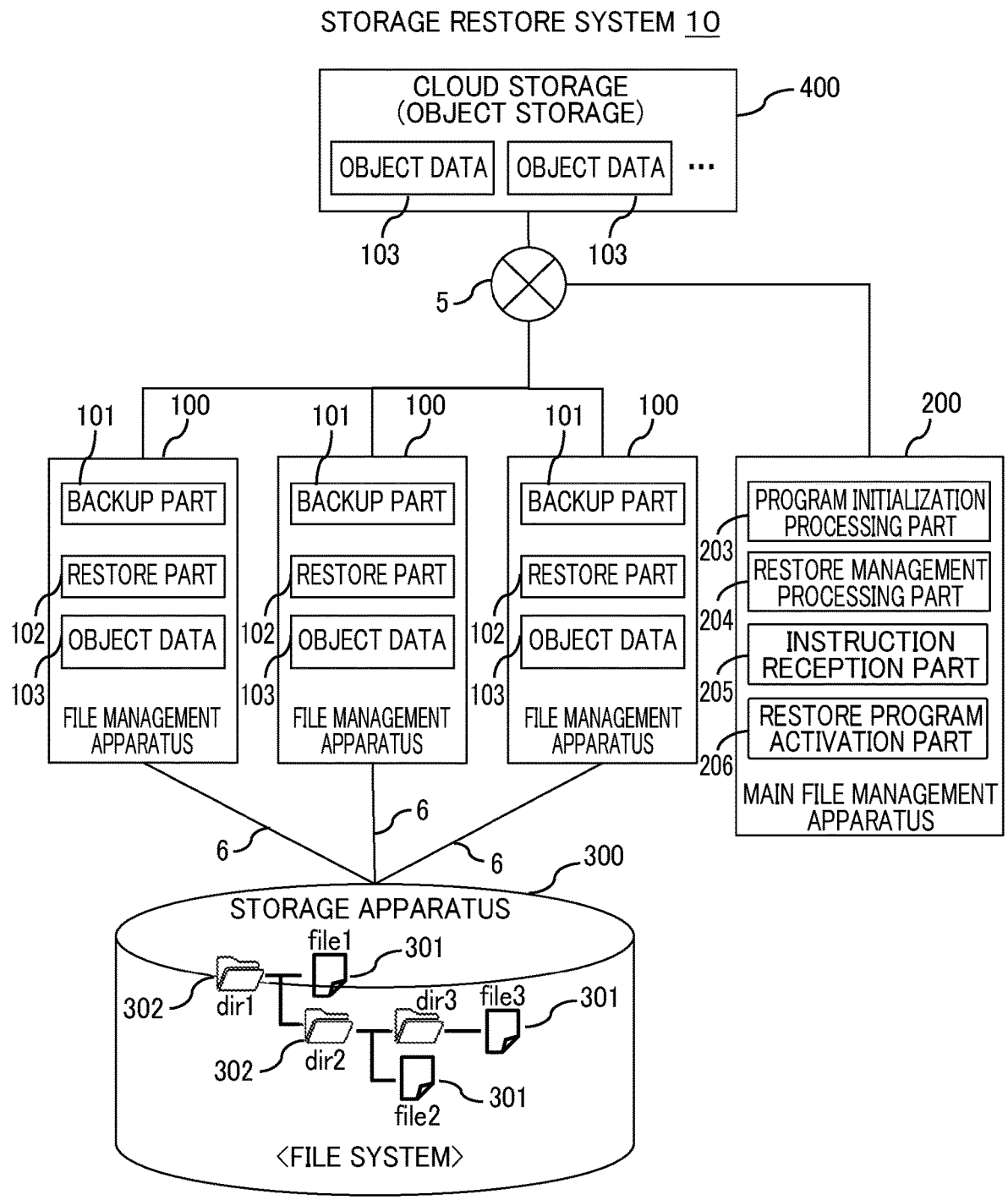
FIG. 1 is a diagram showing an example configuration of a storage restore system according to Embodiment 1.

FIG. 1 is a diagram showing an example configuration of a storage restore system 10 according to Embodiment 1. The storage restore system 10 is configured including a storage apparatus 300 that stores files 301 and directories 302, a cloud storage 400 that stores backup data for the files 301 and the directories 302 in the storage apparatus 300, a plurality of file management apparatuses 100 that perform processing to back up the files 301 and the directories 302 in the storage apparatus 300 to the cloud storage 400 and processing to restore the backup data (the files 301 and the directories 302) in the cloud storage 400 back to the storage apparatus 300, and a main file management apparatus 200 that manages the backup and restore performed by each of the file management apparatuses 100.

The storage apparatus 300, the cloud storage 400, the file management apparatuses 100, and the main file management apparatus 200 are communicatively coupled via wired or wireless networks 5, 6 such as, for example, a local area network (LAN), a wide area network (WAN), the Internet, or a dedicated line.

The storage apparatus 300 has a predetermined file system and stores a plurality of directories 302 and a plurality of files 301 in accordance with the specifications of this file system.

The directories 302 and the files 301 form a hierarchical structure. For example, one or more files 301 or directories 302 belong to a certain directory 302 of a certain layer. In other words, the one or more files 301 or directories 302 are in a layer immediately under the certain directory 302, and conversely, the certain directory 302 is in a layer immediately above the one or more files 301 or directories 302. Hereinafter, a directory 302 to which a certain file 301 or directory 302 belongs (a directory 302 in a layer immediately above) is referred to as a parent directory.

Note that the term "directory" used in the present embodiment refers to an element that groups together files or other directories hierarchically as described above, and may be called using a different term such as "folder."

Next, each of the file management apparatuses 100 includes the following functional parts (programs): a backup part 101 and a restore part 102.

The backup part 101 generates object data 103 including a file 301 or directory 302 and parent directory information, the file 301 or directory 302 being stored in the storage apparatus 300 designated to be backed up, and the parent directory information being information on a parent directory to which the file 301 or directory 302 belongs.

The object data 103 is backup data stored in the cloud storage 400. The object data 103 has a data structure in accordance with the specifications of the cloud storage 400. The object data 103 has a structure different from the file system of the storage apparatus 300 and does not directly support information having a hierarchical structure.

As will be described later, the object data 103 is formed by body data, which is the entity part of the file 301 or directory 302, and metadata, in which the attributes of the file 301 or directory 302 are set. The object data 103 is given unique identification information (object name) when generated.

In the storage apparatus 300 to which to recover the file 301 or directory 302 in the object data 103, the restore part 102 first generates a parent directory indicated by the parent directory information in the object data 103, and then stores the file 301 or directory 302 in the object data 103 at a layer under the parent directory thus generated.

In the present embodiment, the parent directory information is information including identification information (object name) on object data 103 for the directory to which the recovery target file 301 or directory 302 belongs (a parent directory) and the name of the file 301 or directory 302 as used in the file system of the storage apparatus 300 to be backed up (such a name is hereinafter referred to as a path name).

Next, the main file management apparatus 200 includes the following functional parts (programs): a program initialization processing part 203, a restore management processing part 204, an instruction reception part 205, and a restore program activation part 206.

The program initialization processing part 203 performs preprocessing necessary for a restore of the file 301 or directory 302 indicated by the object data 103.

The restore management processing part 204 performs processing to perform overall control regarding restores.

The restore program activation part 206 instructs the restore part 102 of each file management apparatus 100 to recover object data for which it is responsible.

The instruction reception part 205 receives, from a user, an instruction instructing the file management apparatuses 100 to execute restore processing. The instruction reception part 205 also receives a request to check whether the restore processing executed is complete.

Figure 2:
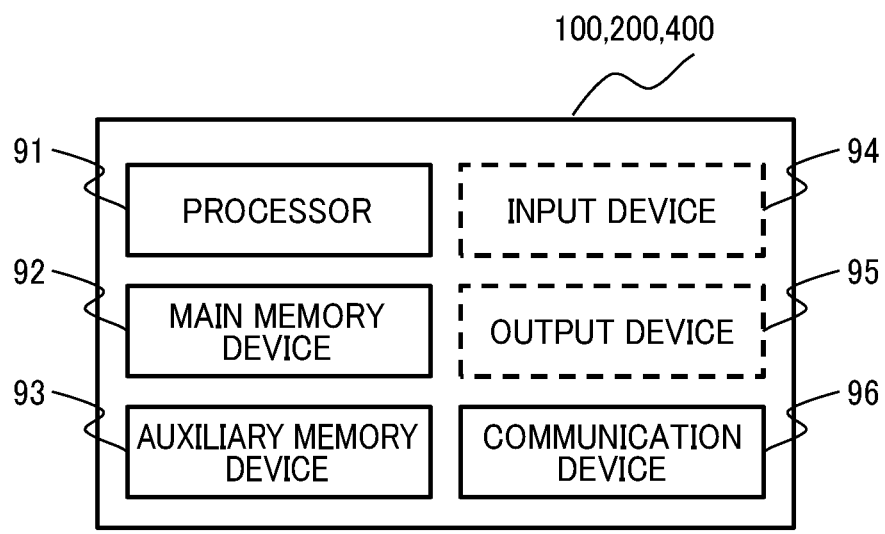
FIG. 2 is a diagram illustrating an example of hardware that a file management apparatus, a main file management apparatus, and a cloud storage have.

FIG. 2 is a diagram illustrating an example of hardware that the file management apparatuses 100, the main file management apparatus 200, and the cloud storage 400 have. These information processing apparatuses each include a processor 91 such as a central processing unit (CPU), a micro-processing unit (MPU), or a graphics processing unit (GPU), a main memory device 92 such as a read-only memory (ROM) or a random-access memory (RAM), an auxiliary memory device 93 such as a hard disk drive, a flash memory, or a solid-state drive (SSD), and a communication device 96 such as a network interface card (NIC), a wireless communication module, a universal serial interface (USB) module, or a serial communication module. These information processing apparatuses may also include an input device 94, such as a keyboard, a mouse, a card reader, or a touch panel, and an output device 95, such as a liquid crystal display (LCD), an audio output device (a speaker), or a printing device.

The functions of the file management apparatus 100, the main file management apparatus 200, and the cloud storage 400 are implemented when the processor 91 reads and executes programs stored in the main memory device 92 or the auxiliary memory device 93. The above programs can be, for example, recorded in recording media and distributed.

Next, processing performed by the storage restore system 10 is described.

<Backup Management Processing>

Figure 3:
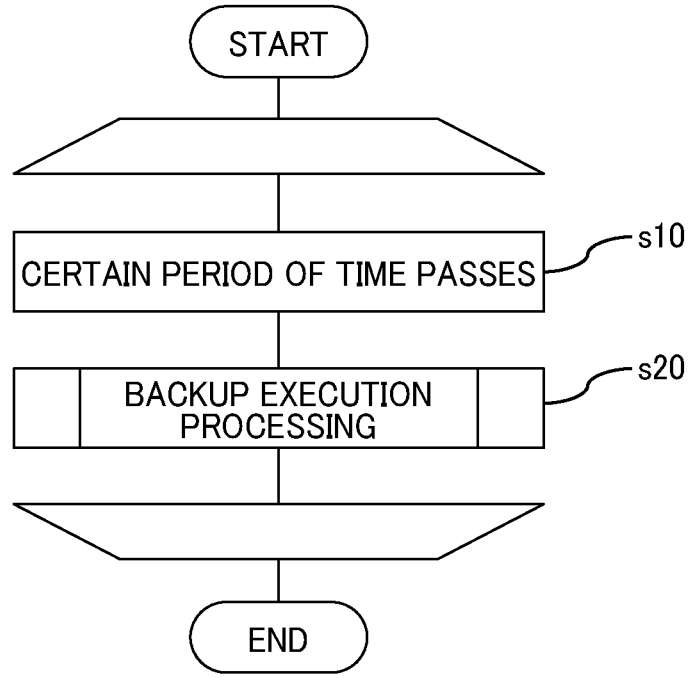
FIG. 3 is a flowchart illustrating an overview of backup management processing.

FIG. 3 is a flowchart illustrating an overview of backup management processing for backing up data in the storage apparatus 300 to the cloud storage 400. Backup management processing is started when, for example, a predetermined input is made by a user with respect to the main file management apparatus 200.

Specifically, every time a certain period of time passes (s10), the backup part 101 executes backup execution processing s20 to back up data in the storage apparatus 300 to the cloud storage 400. Details of the backup execution processing s20 are given next.

<Backup Execution Processing>

Figure 4:
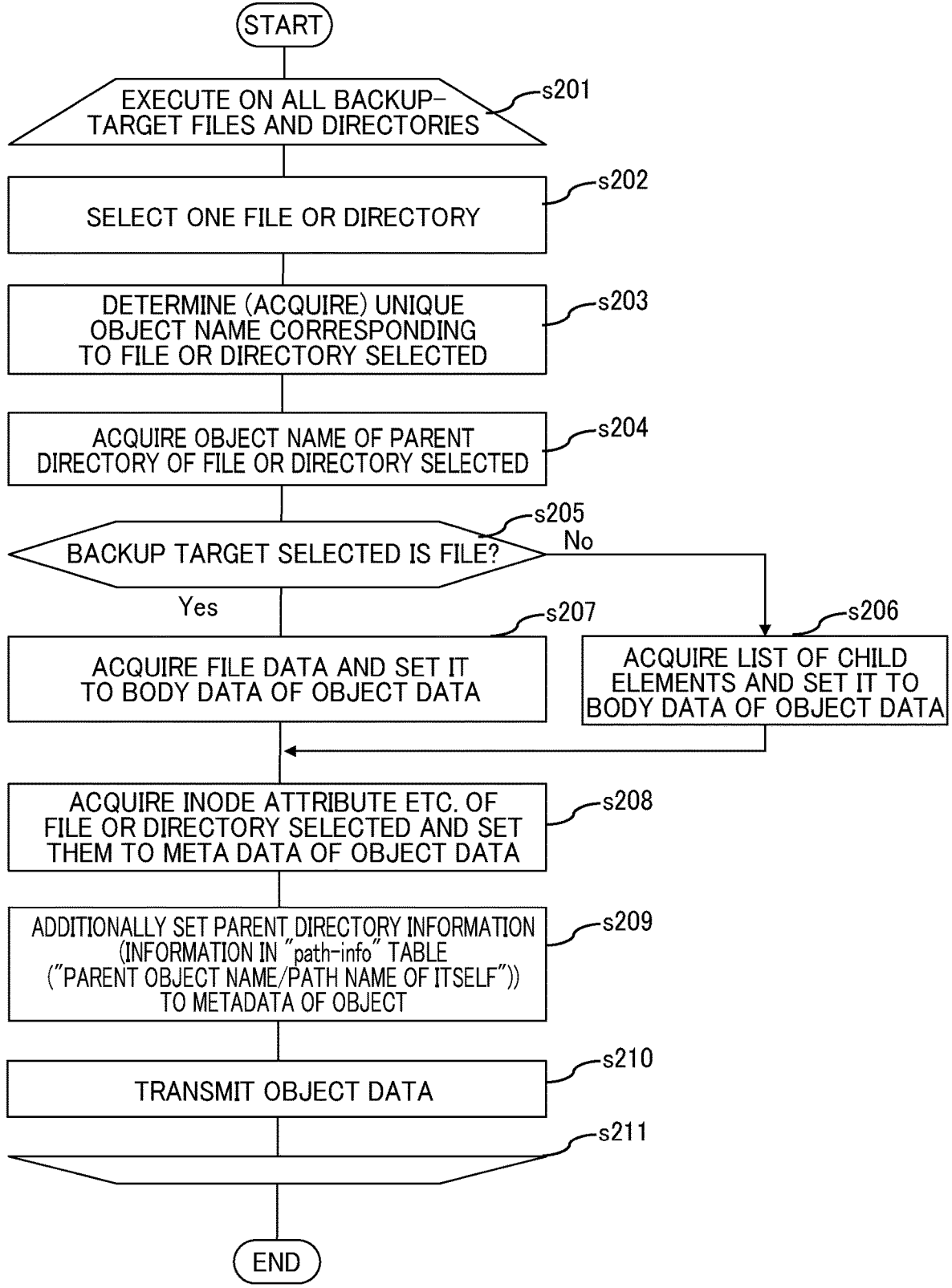
FIG. 4 is a flowchart illustrating details of backup execution processing.

FIG. 4 is a flowchart illustrating details of the backup execution processing s20. It is assumed here that the main file management apparatus 200 already has stored therein files 301 and directories 302 to back up (backup targets) based on, e.g., designation inputted by a user.

The backup part 101 sets names (object names) to the respective pieces of object data corresponding to backup targets. The backup part 101 then selects one of the backup targets (s201, s202).

For instance, the backup part 101 sets identification information to each of the backup targets as an object name unique to the backup target (e.g., object_001, object_002, object_003, . . . ). For example, inode attribute information in the metadata of the file 301 or the directory 302 can be used as the object name.

Next, the backup part 101 acquires an object name corresponding to the backup target selected in s202 (s203).

Then, the backup part 101 acquires the object name of the directory 302 to which the backup target selected in s202 belongs (i.e., the parent directory) (s204).

The backup part 101 then checks whether the backup target selected in s202 is a file 301 (s205). If the backup target selected is a file 301 (s205: Yes), the backup part 101 executes processing in s207, and if the backup target selected is not a file 301 (i.e., is a directory 302) (s205: No), the backup part 101 executes processing in s206.

In s206, as the body data of object data 103, the backup part 101 acquires a list of the names (path names) of files 301 and directories 302 belonging to the backup target selected (i.e., child elements of a parent directory) as used in the file system of the storage apparatus 300 and a list of the object names of those files 301 and directories 302. After that, the processing in s208 is performed. The body data (lists of child elements and their object names) is acquired to satisfy the specifications of the object data 103 required by the cloud storage 400.

Meanwhile, in s207, as the body data of object data 103, the backup part 101 acquires the entity part of the file 301 which is the selected backup target, from the file system of the storage apparatus 300. Then, the processing in s208 is executed.

In s208, as the metadata of the object data 103, the backup part 101 acquires metadata on the selected backup target as used in the file system of the storage apparatus 300 (e.g., for example, inode attribute, file access right, and an update time).

Then, the backup part 101 generates the object data 103 having, as its metadata, information usable as identification information among the pieces of information in the metadata acquired in s208 and (e.g., inode attribute) and having, as its body data, the data acquired in s206 or s207 (s209).

Further, the backup part 101 adds parent directory information (path-info) to the metadata of the object data 103, the parent directory information being data formed by the name (path name) of the file 301 or directory 302 selected in s202 as used in the file system of the storage apparatus 300 and the object name of the parent directory acquired in s204 (s209).

Then, the backup part 101 transmits the object data 103 generated by the processing in the steps up to s209 to the cloud storage 400 (s210).

The backup part 101 executes the above processing from s202 to s210 on all the backup targets and ends the backup execution processing s20.

Figure 5:
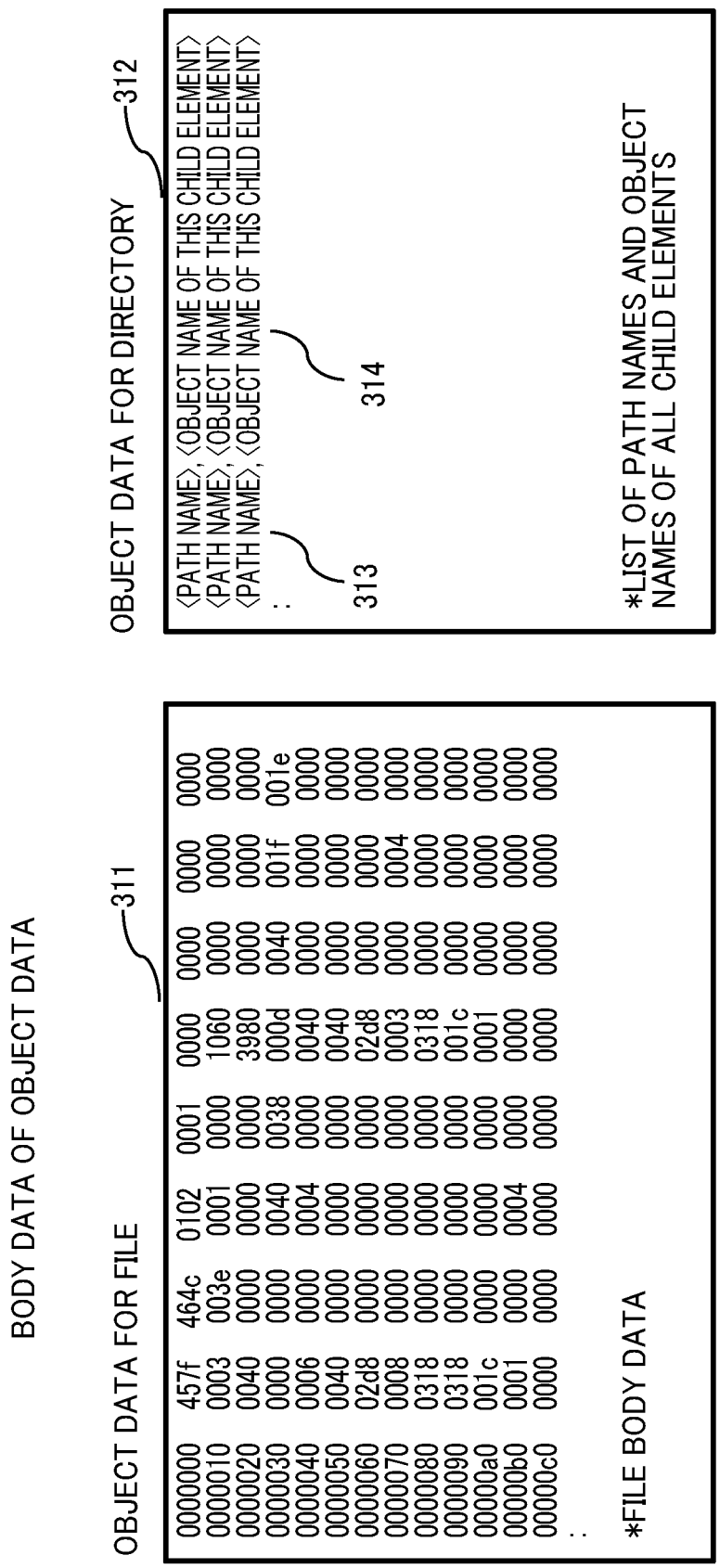
FIG. 5 is a diagram showing a specific example of body data of object data.

FIG. 5 is a diagram showing a specific example of the body data of the object data 103. As shown in FIG. 5, in a case of a file, body data 311 is formed by, e.g., binary data which is the entity part of the file. In a case of a directory, body data 312 is formed by a list 313 of path names and a list 314 of object names of child elements of the directory.

Next, FIG. 6 is a diagram showing an example data structure of the metadata of the object data 103. As shown in FIG. 6, metadata 305 of the object data 103 includes the size of the file, the time of the last update of the file or directory, permission information on and the type of the file or directory, owner information, group information, and parent directory information 306. Note that the parent directory information 306 includes the object name of a parent directory and the name (path name) of the file or directory as used in the file system of the storage apparatus 300.

Next, a description is given of processing for recovering files 301 and directories 302 to the storage apparatus 300 as a recovery destination.

<Restore Management Processing>

Figure 7:
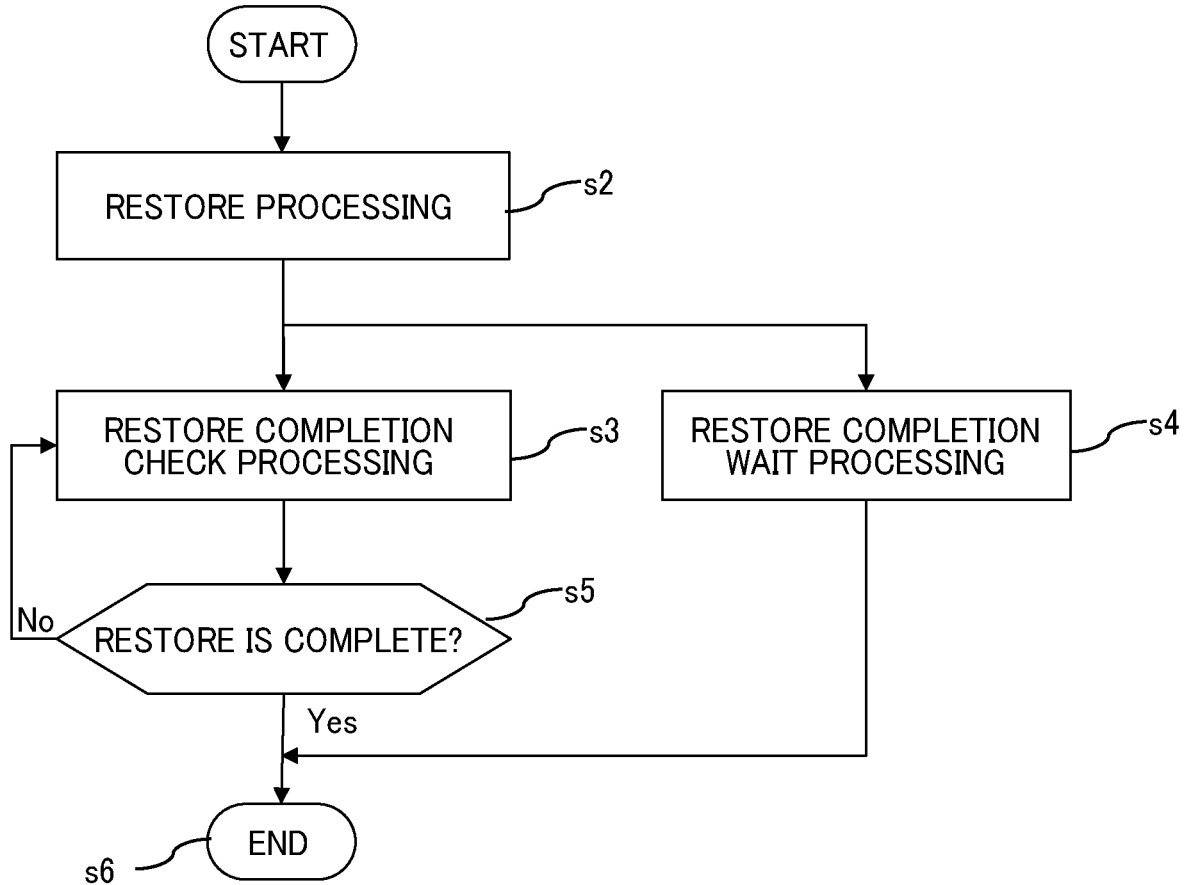
FIG. 7 is a flowchart illustrating an example of restore management processing.

FIG. 7 is a flowchart illustrating an example of restore management processing, which is processing performed to restore the object data 103 stored in the cloud storage 400 back to the storage apparatus 300. The restore management processing is started when, e.g., the main file management apparatus 200 receives a restore instruction inputted from a user.

First, the restore management processing part 204 executes restore processing s2 to start execution of restores.

After that, the restore management processing part 204 executes restore completion check processing s3 to check whether the restore started by the restore processing s2 is complete. If the restore is complete (s5: Yes), the restore management processing ends (s6), and if the restore is not complete (s5: No), the restore management processing part 204 executes the restore completion check processing s3 again.

Alternatively, the restore management processing part 204 executes restore completion wait processing s4 to wait for the restore started by the restore processing s2 to be completed. Once the restore is complete, the restore management processing ends (s6).

Note that the restore completion check processing s3 and the restore completion wait processing s4 may be executed in combination.

Details of the restore processing s2, the restore completion check processing s3, and the restore completion wait processing s4 are described below.

<Restore Processing>

Figure 8:
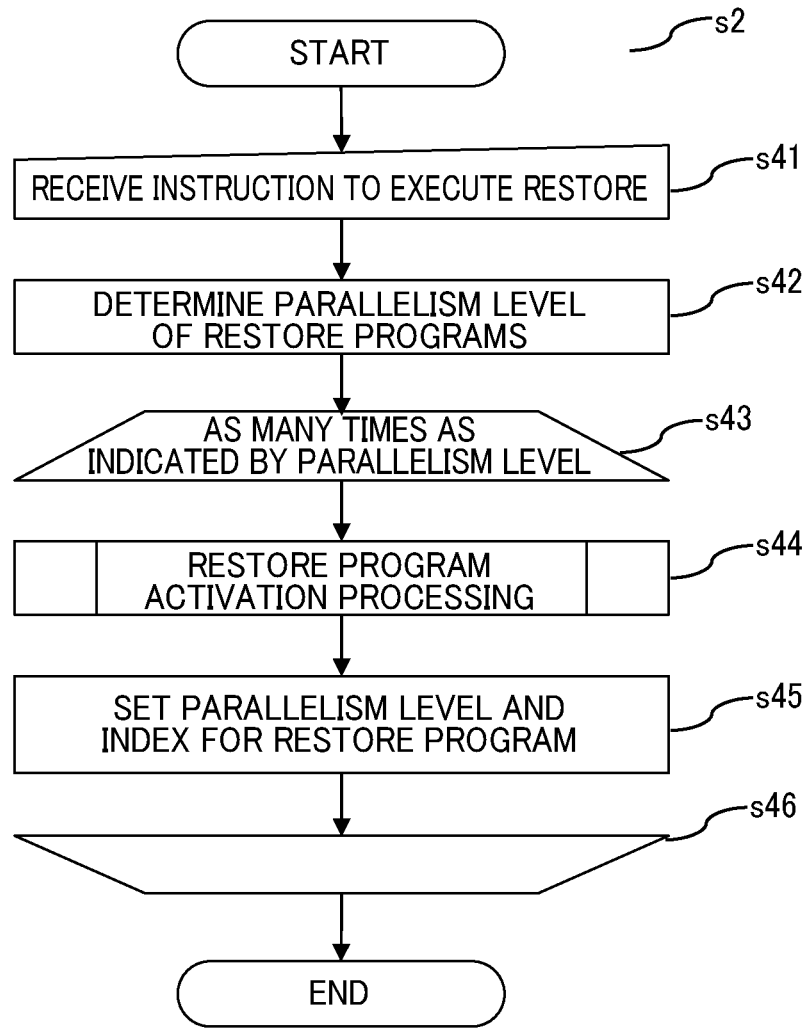
FIG. 8 is a flowchart illustrating an example of restore processing.

FIG. 8 is a flowchart illustrating an example of the restore processing s2. First, the program initialization processing part 203 of the main file management apparatus 200 receives an input instructing a restore (s41). For example, the program initialization processing part 203 receives designation of one or more pieces of object data 103 (recovery objects) from a user. Note that the program initialization processing part 203 may automatically determine the recovery objects.

The program initialization processing part 203 determines the number of file management apparatuses 100 (which are specifically restore parts 102 and are hereinafter referred to as restore execution programs) that execute restores of the recovery objects in parallel (s42) (this number is hereinafter referred to as parallelism level). For example, the program initialization processing part 203 receives input of parallelism level from a user. Alternatively, the program initialization processing part 203 may automatically determine the parallelism level by calculating the number of file management apparatuses 100 capable of parallel execution based on the performance of each of the file management apparatuses 100 (for example, the performance of the CPU, memory, or the like).

The program initialization processing part 203 allocates one or more recovery objects (assigned objects) to each of the restore execution programs and then executes restore program activation processing s44 to cause each of the restore execution programs to restore the objects allocated and assigned thereto. Details of the restore program activation processing s44 will be described later.

The program initialization processing part 203 stores, in division management information to be described later, the parallelism level determined in s42 and the unique numbers of the respective restore execution programs (s45).

Note that the restore program activation part 206 repeats the processing in s44 and s45 for each of the restore execution programs (as many times as the number indicated by the parallelism level) (s43). The restore processing s2 thus ends.

(Division Management Information)

FIG. 9 is a diagram showing an example of division management information. Division management information 410 stores parallelism level 401 and unique number 402 of each restore part 102 (restore execution program).

<Restore Program Activation Processing>

Figure 10:
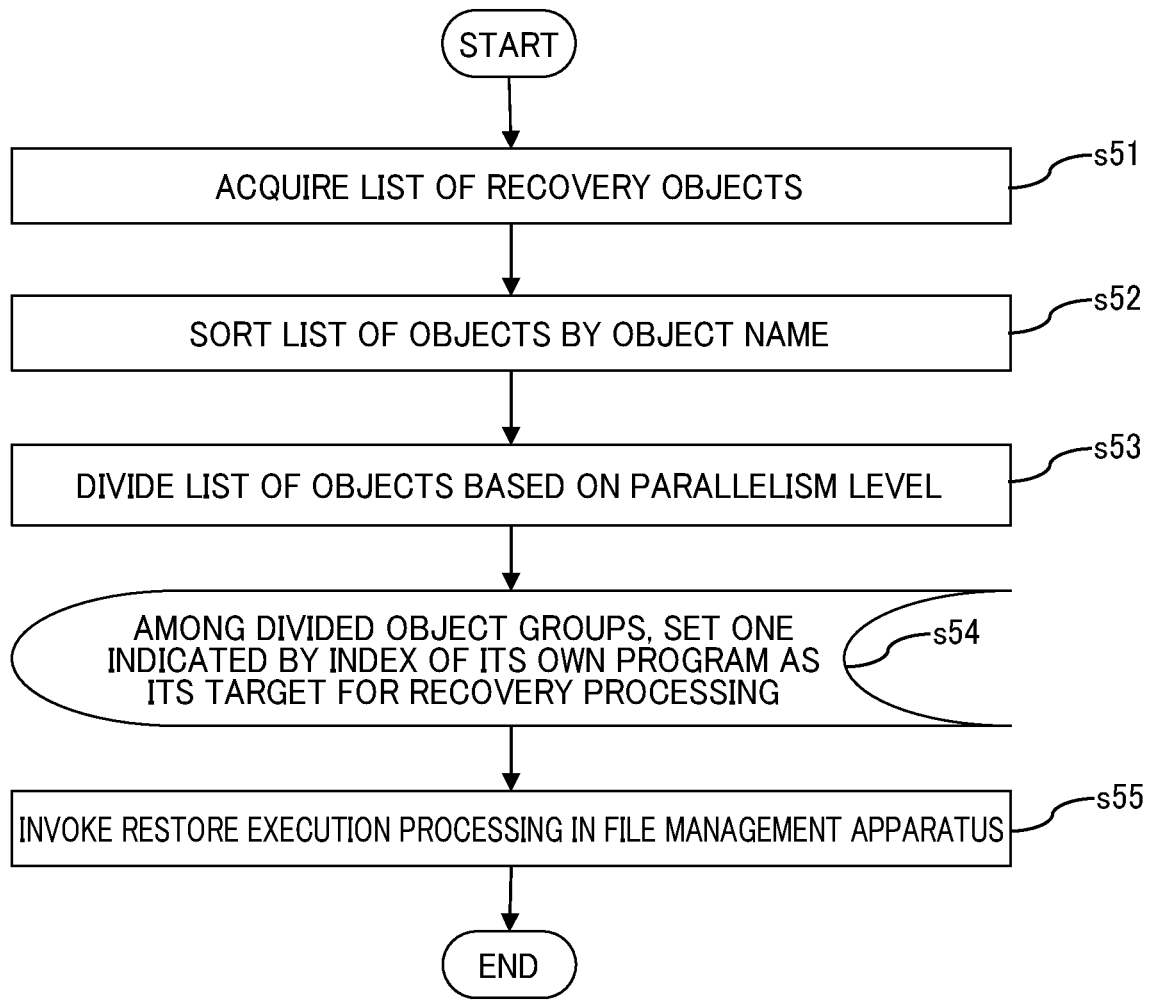
FIG. 10 is a flowchart illustrating details of restore program activation processing.

FIG. 10 is a flowchart illustrating the details of the restore program activation processing s44. The program initialization processing part 203 of the main file management apparatus 200 acquires a list of recovery objects from the cloud storage 400 (s51).

The program initialization processing part 203 sorts the acquired list of objects in accordance with a predetermined rule (for example, in ascending order of names) (s52).

The program initialization processing part 203 divides the list of the recovery objects thus sorted out into as many groups as the number indicated by the parallelism level (s53).

Based on the constituents of (object data pieces in) each of the groups thus divided, the program initialization processing part 203 determines assigned objects for which each restore execution program (restore part 102) is responsible (s54).

For example, in accordance with a predetermined order (for example, the sort order of the groups), the program initialization processing part 203 automatically determines, for each restore execution program, assigned objects for which the restore execution program is responsible. Note that the program initialization processing part 203 may have a user select the assigned objects for the restore execution programs from the groups divided in s53.

The program initialization processing part 203 causes the restore parts 102 to restore the objects determined and assigned to the restore execution programs in s54 (s55). Details of this processing (restore execution processing) will be described next. The restore program activation processing s44 thus ends.

<Restore Execution Processing>

Figure 11:
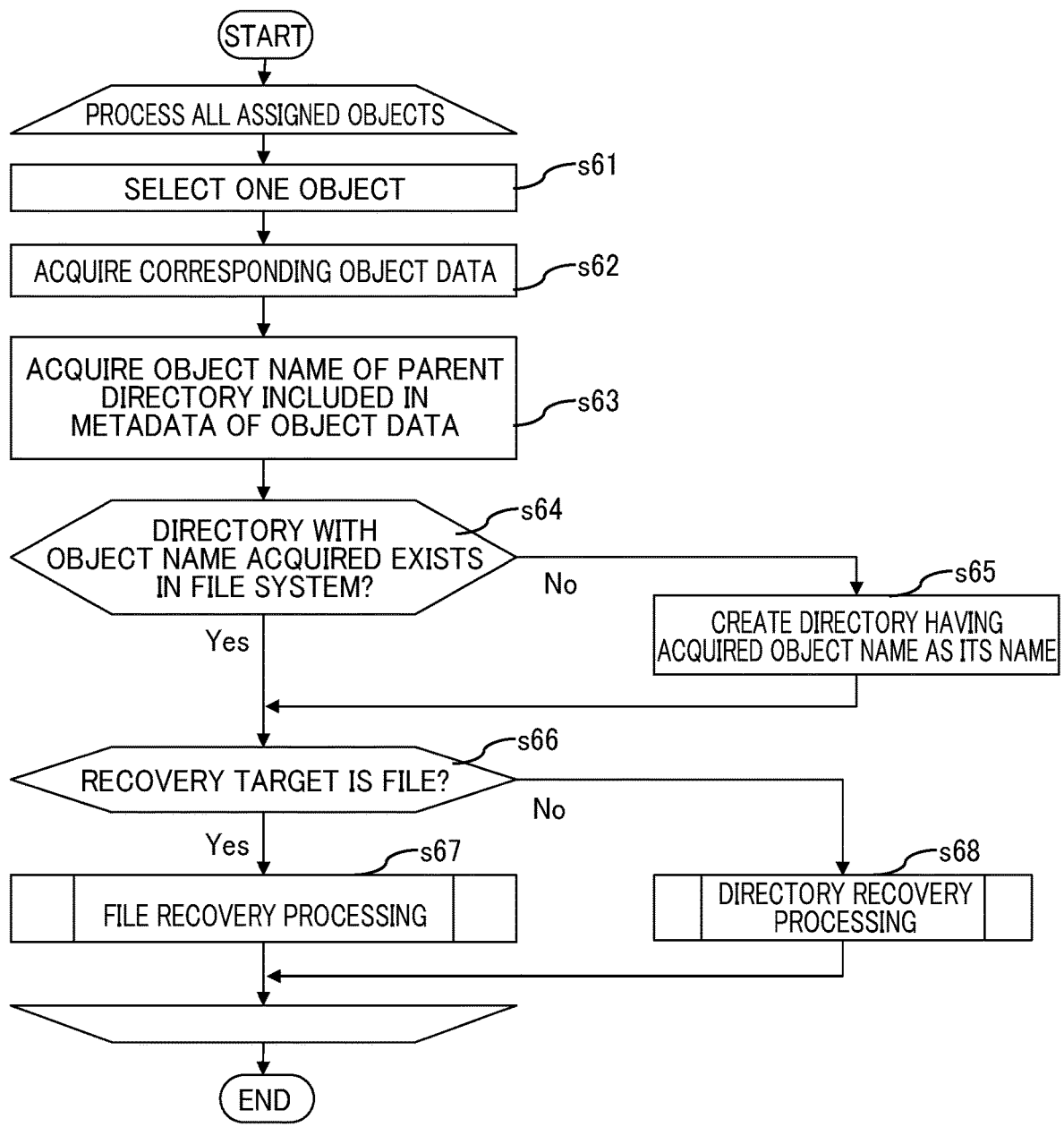
FIG. 11 is a flowchart illustrating an example of restore execution processing.

FIG. 11 is a flowchart illustrating an example of restore execution processing.

First, the restore part 102 of the file management apparatus 100 selects one of its assigned objects (s61) and acquires, from the cloud storage 400, the object data 103 on the assigned object thus selected (s62).

The restore part 102 extracts parent directory information (path-info) in the metadata of the object data 103 acquired in s62, identifies a parent directory in the parent directory information extracted, and acquires the object name of the parent directory (s63).

The restore part 102 determines whether a directory that has the object name acquired in s63 as its name exists in the file system of the storage apparatus 300 which is a restore destination (s64).

If such a directory exists in the file system of the storage apparatus 300 (s64: Yes), the restore part 102 executes processing in s66, and if such a directory does not exist in the file system of the storage apparatus 300 (s64: No), the restore part 102 executes processing in s65.

In s65, the restore part 102 creates, in the file system of the storage apparatus 300, a directory (a parent directory) that has the object name acquired in s63 as its name. After that, processing in s66 is performed.

In s66, the restore part 102 determines whether the object data 103 selected in s61 is object data 103 on a file 301. If the object data 103 is object data 103 on a file 301 (s66: Yes), the restore part 102 executes file recovery processing s67 to recover the file 301 back to the file system of the storage apparatus 300, and if the object data 103 is not object data 103 on a file 301 (i.e., is object data on a directory 302) (s66: No), the restore part 102 executes directory recovery processing s68 to recover the directory 302 back to the file system of the storage apparatus 300. Details of the file recovery processing s67 and the directory recovery processing s68 will be described later.

The restore part 102 repeats the above processing for object data 103 on all its assigned objects and ends the restore execution processing.

Note that the above restore execution processing is executed by a plurality of restore parts 102 in parallel.

<File Recovery Processing>

Figure 12:
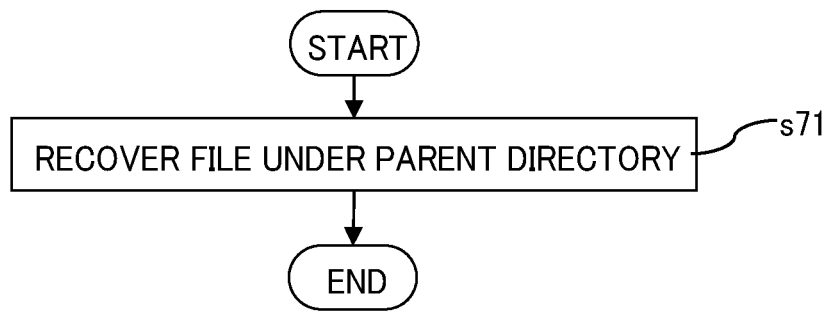
FIG. 12 is a flowchart illustrating details of file recovery processing.

FIG. 12 is a flowchart illustrating details of the file recovery processing s67. The restore part 102 recovers the file 301 indicated by the object data 103 acquired in s61 back to the file system of the storage apparatus 300 (s71).

Specifically, under the parent directory identified in s64 or generated in s65, the restore part 102 generates a file 301 having the path name in the parent directory information in the object data 103 as a file name thereof. The file recovery processing s67 thus ends.

<Directory Recovery Processing>

Figure 13:
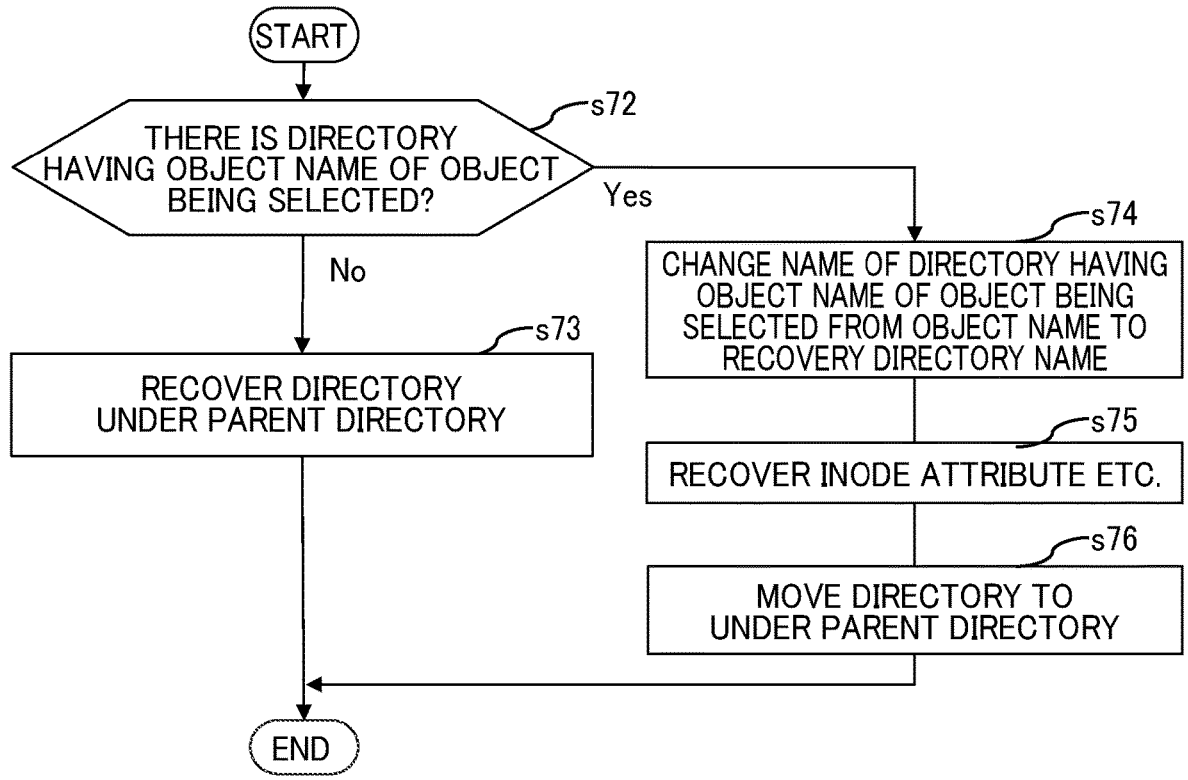
FIG. 13 is a flowchart illustrating details of directory recovery processing.

FIG. 13 is a flowchart illustrating details of the directory recovery processing s68. The restore part 102 checks whether the recovery-destination storage apparatus 300 has a directory having the object name of the object data 103 selected in s61 (i.e., the directory 302) as a directory name thereof (s72).

If there is a temporary recovery directory (s72: Yes), the restore part 102 executes processing in s74, and if there is no temporary recovery directory (s72: No), the restore part 102 executes processing in s73.

In s73, under the parent directory identified in s64 or generated in s65, the restore part 102 generates a new directory 302 having the path name in the parent directory information in the object data 103 acquired in s62 as a directory name thereof. The directory 302 corresponding to the object data 103 selected in s61 is thereby recovered. The directory recovery processing s68 then ends.

Meanwhile, in s74, the restore part 102 changes the name of the temporary recovery directory from the current object name to the path name in the parent directory information in the object data 103 acquired in s62.

Then, the restore part 102 sets the metadata in the object data 103 acquired in s62 (such as inode attribute and the time of last update) to the metadata of the directory 302 changed in name in s74 (s75).

The restore part 102 sets the directory 302 generated in s74, s75 as a directory 302 under the parent directory identified in s64 or generated in s65 (s76). As a result, the directory 302 corresponding to the object data 103 selected in s61 and the parent directory thereof are both recovered back to what they were when backed up. The directory recovery processing s68 thus ends.

Figure 14:
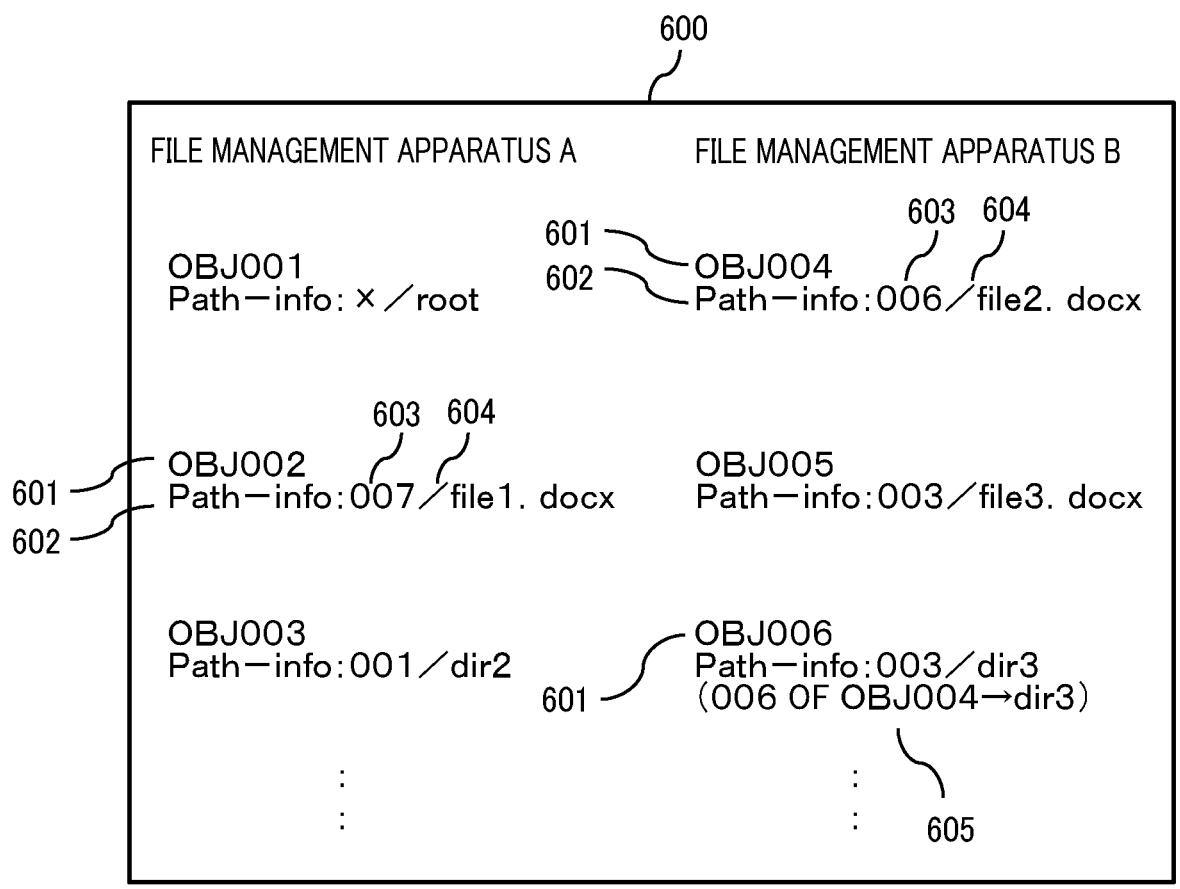
FIG. 14 is a diagram showing an example of log information outputted in the restore execution processing.

FIG. 14 is a diagram showing an example of log information outputted in the restore execution processing. This log information 600 stores the contents of restore processing executed by the file management apparatuses 100 in parallel. For example, the log information 600 includes a recovery history of object data 601 acquired by each file management apparatus 100 and parent directory information 602 in the object data 601 (an object name 603 of the parent directory and a path name 604 of the file 301 or directory 302 which is the object). In a case where the file management apparatus 100 finds a temporary recovery directory, the log information 600 includes information 605 indicating that the name of the temporary recovery directory has been changed from object name to path name. Note that the storage restore system 10 may output the contents of the log information 600 to a file or may display them on a screen.

<Restore Completion Check Processing>

Figure 15:
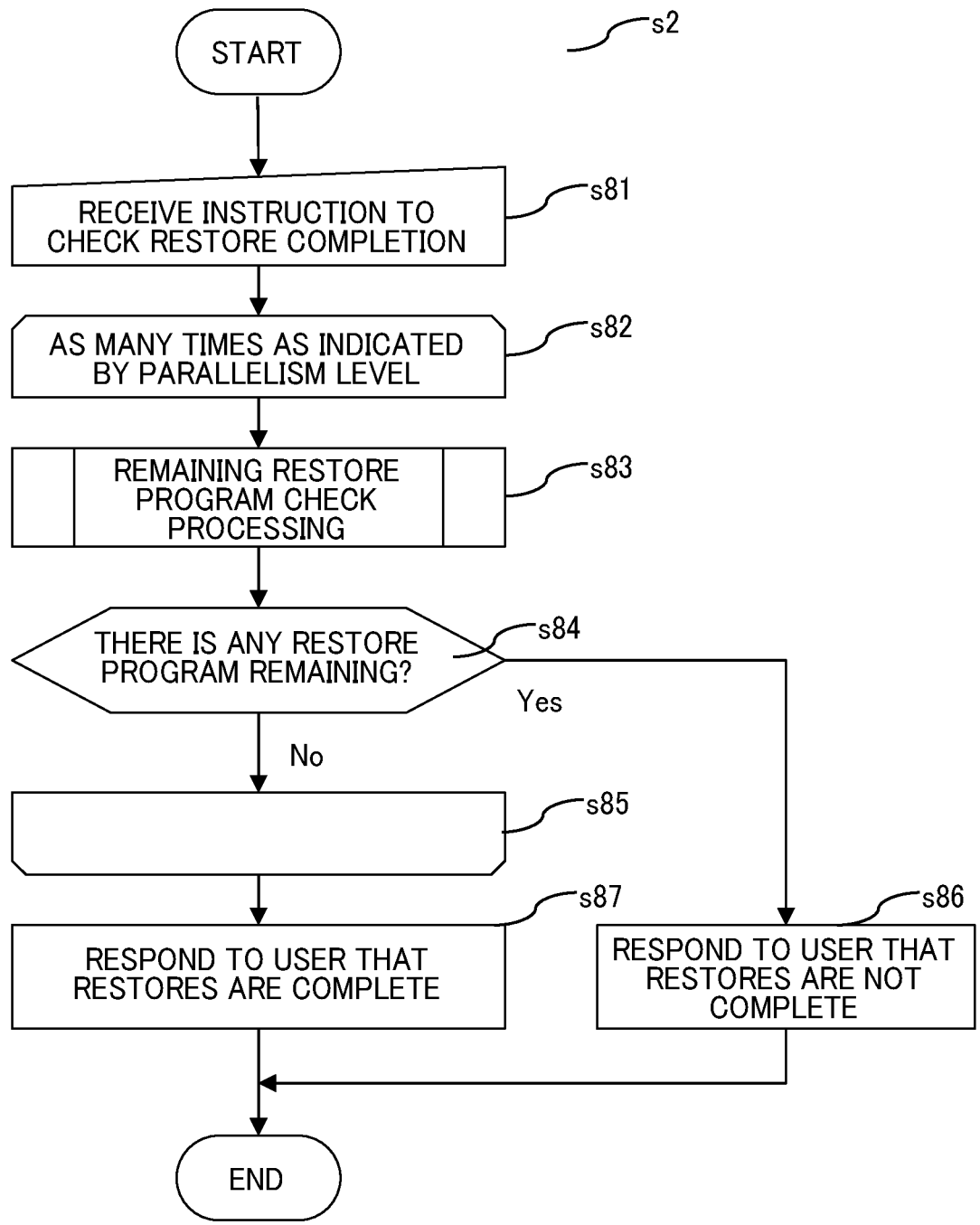
FIG. 15 is a flowchart illustrating an example of restore completion check processing.

Next, FIG. 15 is a flowchart illustrating an example of restore completion check processing.

First, the instruction reception part 205 of the main file management apparatus 200 waits for a predetermined check input from a user (s81).

Upon receipt of a check input, the instruction reception part 205 executes remaining restore program check processing s83 to check, for each file management apparatus 100 instructed to execute a restore (s82 and s85), whether the file management apparatus 100 is currently executing restore execution processing. Details of the remaining restore program check processing s83 will be given later.

If any of the file management apparatuses 100 is executing restore execution processing (s84: Yes), the instruction reception part 205 displays a screen indicating that restores are not complete yet (s86) and ends the restore completion check processing.

If none of the file management apparatuses 100 is executing restore execution processing (the restore execution processing is all complete) (s84: No), the instruction reception part 205 displays a screen indicating that the restores are complete (s87) and ends the restore completion check processing.

<Remaining Restore Program Check Processing>

Figure 16:
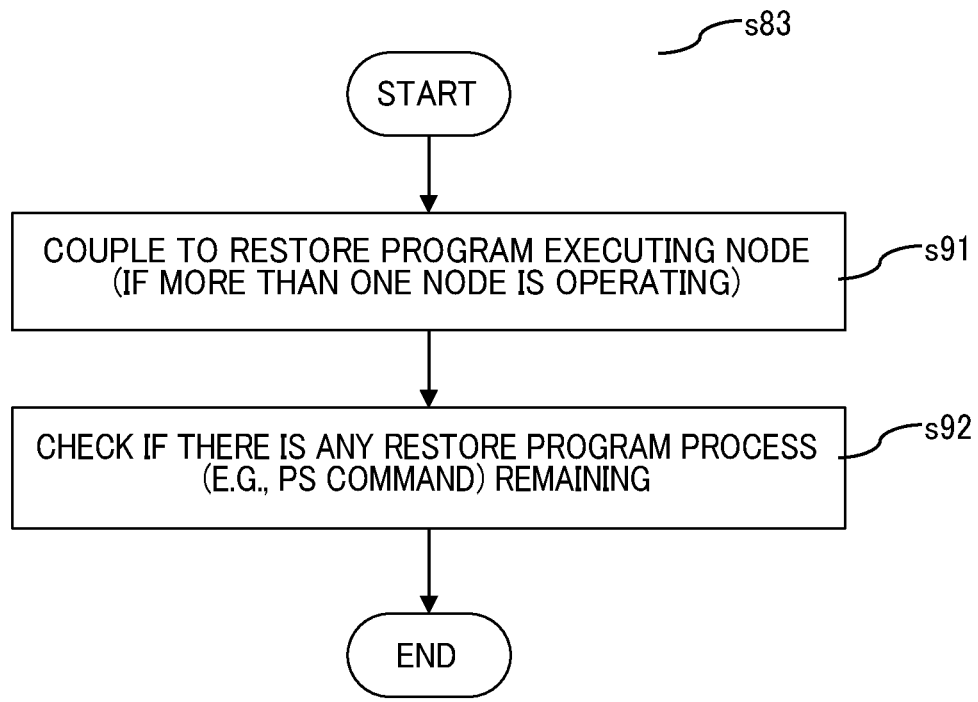
FIG. 16 is a flowchart illustrating an example of remaining restore program check processing.

FIG. 16 is a flowchart illustrating an example of the remaining restore program check processing s83. The instruction reception part 205 couples to a file management apparatus 100 for which to check whether the file management apparatus 100 is executing restore execution processing (s91). The instruction reception part 205 then transmits a predetermined check signal to the file management apparatus 100 to which it is coupled and then waits to receive a response signal. For example, the instruction reception part 205 transmits a command to the file management apparatus 100 requesting to display a list of processes being executed.

Based on a response signal received, the instruction reception part 205 checks whether the check-target file management apparatus 100 is still executing restore execution processing (s92). The remaining restore program check processing s83 thus ends.

<Restore Completion Wait Processing>

Figure 17:
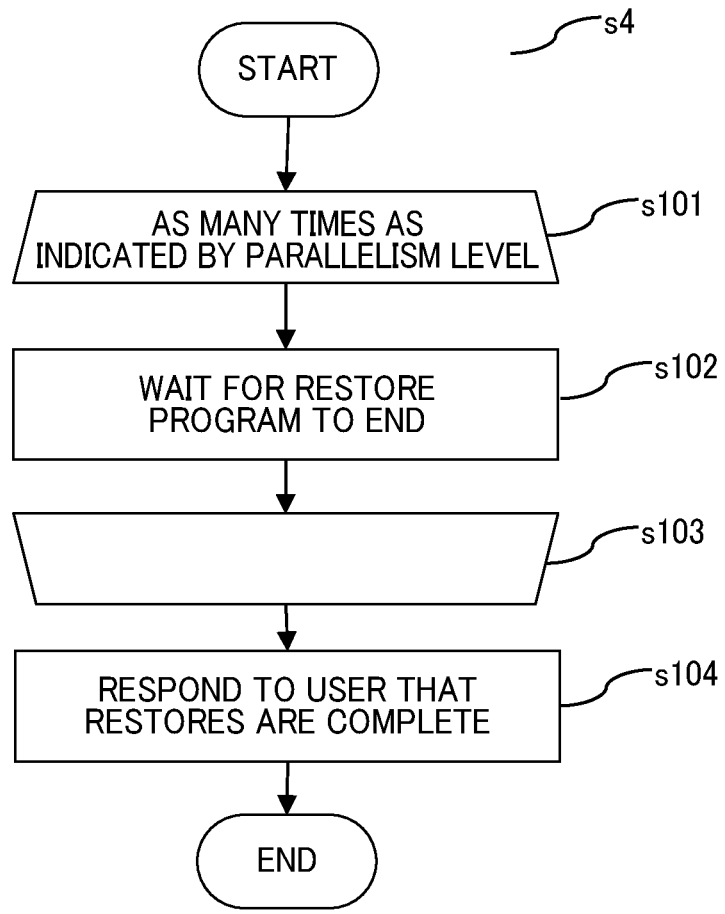
FIG. 17 is a flowchart illustrating an example of restore completion wait processing.

FIG. 17 is a flowchart illustrating an example of the restore completion wait processing s4.

The instruction reception part 205 of the main file management apparatus 200 checks whether all the file management apparatuses 100 instructed to execute a restore have completed restores (s101 and s102). For example, the instruction reception part 205 transmits a signal to each of the file management apparatuses 100 to inquire whether the restore program activation processing s44 is complete, and then waits for reception of a response signal. Alternatively, for example, the instruction reception part 205 waits for reception of a completion signal that each file management apparatus 100 transmits voluntarily when ending a restore.

After confirming that all the file management apparatuses 100 have completed restores (s101 and s103), the instruction reception part 205 displays a screen indicating restore completion (s104) and ends the restore completion wait processing s4.

Embodiment 2

Figure 18:
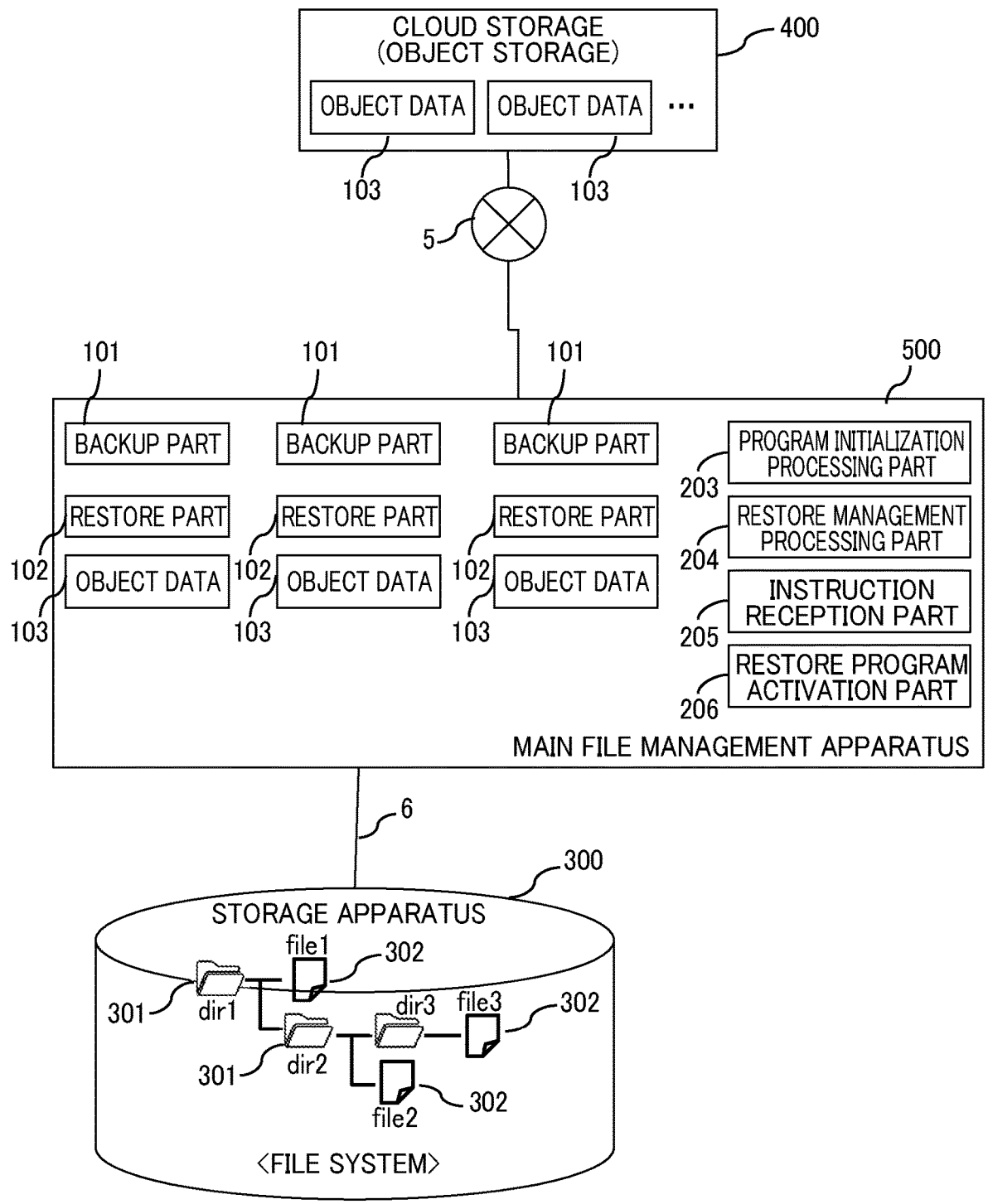
FIG. 18 is a diagram showing an example configuration of a storage restore system according to Embodiment 2.

FIG. 18 is a diagram showing an example configuration of a storage restore system 20 according to Embodiment 2. The storage restore system 20 is such that the plurality of file management apparatuses 100 and the main file management apparatus 200 in Embodiment 1 are configured as one file management apparatus 500. The file management apparatus 500 has the backup parts 101, the restore parts 102, and the object data 103 in a plurality of storage areas corresponding to the file management apparatuses 100. Backup processing and restore processing similar to those performed in Embodiment 1 can still be implemented in such a configuration.

As thus described, the storage restore system of the present embodiment generates object data 103 including data on a file 301 or directory 302 in the storage apparatus 300 designated as a backup source and parent directory information thereon, sets, in the storage apparatus 300 to which to recover the file 301 or directory 302 indicated by the object data 103, a directory 302 which is indicated by the parent directory information in the object data 103 and to which the file 301 or directory 302 belongs, and stores the file 301 or directory 302 indicated by the object data 103 in the directory 302 thus set.

In other words, the storage restore system of the present embodiment generates object data 103 including a backup target (a file 301 or directory 302) and its parent directory information, uses the object data 103 as a backup target, and to recover the backup target, recovers the backup-target file 301 or directory 302 along with the parent directory.

This eliminates the need as in the prior art to recover files and directories sequentially from the highest layer (root) to the lower layer in the file system. As a result, for example, when a plurality of information processing apparatuses execute recovery processing on backup targets in parallel, the restores can be executed fast due to the lack of dependency on the order of processing the object data 103. Thus, the storage restore system of the present embodiment can recover directories and files fast.

Also, parent directory information of the present embodiment includes not only identification information on the object data 103 but also the name of the backup target (a file 301 or directory 302) as used in the file system of the backup-source storage apparatus 300. In a case of generating a directory 302 indicated by the object data 103, if a directory having an object name as a directory name has been generated in the recovery-destination storage apparatus 300, the storage restore system changes the name of the directory 302 from the object name to the path name written in the parent directory information 306 in the object data 103.

In this way, the name of the directory which is the object data 103 to be recovered can be modified to the original correct name (path name) used in the backup-source storage apparatus 300.

Also, after changing the name of the directory 302, the storage restore system of the present embodiment generates a directory 302 indicated by the object data 103, under the directory thus changed in name. In this way, the directory 302 in the object data 103 can be recovered under the parent directory with the correct name.

Also, when the storage restore system of the present embodiment outputs log information indicating that the name of the directory 302 has been changed from an object name to a path name, the user can check the file recovery process to see whether the restore has been performed correctly.

Also, the storage restore system of the present embodiment allocates a plurality of pieces of object data 103 to a plurality of restore parts, and to restore them, each of the restore parts restores the object data 103 allocated thereto. By thus having a plurality of processing parts restore data in parallel, data can be restored faster.

Also, the storage restore system of the present embodiment is configured including the plurality of file management apparatus 100 each having the restore part 102 and the main file management apparatus 200 that is communicatively coupled to the file management apparatuses and that has the program initialization processing part 203. With this configuration, the restore processing can be apportioned to and performed by the file management apparatuses 100 according to, e.g., the performance of each of the file management apparatuses 100.

Also, in the storage restore system of the present embodiment, a plurality of restore parts 102 execute restores in parallel, thereby enabling fast restores of files 301 and directory 302.

Also, the storage restore system of the present embodiment includes the backup part 101 that generates object data 103 including a file 301 or directory 302 in the storage apparatus 300 to be backed up and parent directory information. Thus, seamless processing can be performed from backup to restore of the file 301 or the directory 302.

The present disclosure is not limited to the embodiment described above and includes various modifications. The embodiment described above has been given to provide detailed descriptions for a better understanding of the present disclosure, and not all the configurations described necessarily have to be included.

For example, some of the functions that the apparatuses in each example have may be provided in a different apparatus, and functions in separate apparatuses may be provided in the same apparatus.

Also, although identification information on an object is inode attribute in the present embodiment, it may be converted into, e.g., a character string, or different unique information used in the system may be allocated.

Also, in the present embodiment, the determination of objects for which each file management apparatus 100 is responsible is made under the assumption that the file management apparatuses 100 are allocated an equal number of objects to be responsible for. Alternatively, the number of objects for which each file management apparatus 100 is responsible may be different depending on the performance of the apparatus.

What is claimed is:

1. A storage restore system comprising:
   a processor;
   a memory; and
   a restore part configured to generate, in a recovery-destination storage area to which to recover a file or a directory stored in a designated storage area and indicated by object data including the file or the directory and parent directory information which is information on a directory to which the file or the directory belongs, a directory indicated by the parent directory information in the object data, and configured to generate the file or the directory indicated by the object data under the directory thus generated, wherein
   the parent directory information is information including identification information on object data on the directory to which the file or the directory belongs and a name of the file or the directory as used in the designated storage area,
   the object data on the directory includes the directory stored in the designated storage area and the parent directory information on the directory, and
   when generating a directory indicated by object data, the restore part determines whether a directory having identification information on the object data as a name thereof has been generated in the recovery-destination storage area, and if it is determined that a directory having the identification information on the object data as the name thereof has been generated in the recovery-destination storage area, changes the name of the directory from the identification information on the object data to a name used in the designated storage area and indicated in the parent directory information in the object data.

2. The storage restore system according to claim 1, wherein
   after changing the name of the directory, the restore part generates the directory indicated by the object data, under the directory changed in name.

3. The storage restore system according to claim 1, wherein
   the restore part outputs information indicating that the name of the directory has been changed from the identification information on the object data to the name used in the designated storage area and indicated in the parent directory information in the object data.

4. The storage restore system according to claim 1, further comprising a program initialization processing part configured to allocate a plurality of pieces of the object data to a plurality of the restore parts, wherein
   each of the restore parts generates, in a recovery-destination storage area to which to recover the file or the directory indicated by the object data allocated to the restore part, a directory to which the file or the directory indicated by the parent directory information in the object data belongs, and generates the file or the directory indicated by the object data under the directory thus generated.

5. The storage restore system according to claim 4, wherein
   the storage restore system is configured including a plurality of file management apparatuses each including the restore part and a main file management apparatus communicatively coupled to the file management apparatuses and having the program initialization processing part.

6. The storage restore system according to claim 1, comprising a plurality of the restore parts that perform parallel execution.

7. The storage restore system according to claim 1, further comprising a backup part configured to generate object data including a file or a directory stored in a designated storage area and parent directory information which is information on a directory to which the file or the directory belongs.

8. A storage restore method implemented by an information processing apparatus configured to execute restore processing including generating, in a recovery-destination storage area to which to recover a file or a directory stored in a designated storage area and indicated by object data including the file or the directory and parent directory information that is information on a directory to which the file or the directory belongs, a directory indicated by the parent directory information in the object data, and generating the file or the directory indicated by the object data under the directory thus generated, wherein the parent directory information is information including identification information on object data on the directory to which the file or the directory belongs and a name of the file or the directory as used in the designated storage area, the object data on the directory includes the directory stored in the designated storage area and the parent directory information on the directory, and when generating the directory indicated by the object data, determining whether a directory having identification information on the object data as a name thereof has been generated in the recovery-destination storage area, and if it is determined that a directory having the identification information on the object data as the name thereof has been generated in the recovery-destination storage area, changing the name of the directory from the identification information on the object data to a name used in the designated storage area and indicated in the parent directory information in the object data.

9. A storage medium storing a storage restore program to be executed by an information processing apparatus configured to execute restore processing including generating, in a recovery-destination storage area to which to recover a file or a directory stored in a designated storage area and indicated by object data including the file or the directory and parent directory information which is information on a directory to which the file or the directory belongs, a directory indicated by the parent directory information in the object data, and generating the file or the directory indicated by the object data under the directory thus generated, wherein the parent directory information is information including identification information on object data on the directory to which the file or the directory belongs and a name of the file or the directory as used in the designated storage area, the object data on the directory includes the directory stored in the designated storage area and the parent directory information on the directory, and when generating the directory indicated by the object data, determining whether a directory having identification information on the object data as a name thereof has been generated in the recovery-destination storage area, and if it is determined that a directory having the identification information on the object data as the name thereof has been generated in the recovery-destination storage area, changing the name of the directory from the identification information on the object data to a name used in the designated storage area and indicated in the parent directory information in the object data.

\* \* \* \* \*